(12) United States Patent
Mizuno et al.

(10) Patent No.: US 8,024,107 B2
(45) Date of Patent: Sep. 20, 2011

(54) IGNITION TIMING CONTROL SYSTEM FOR INTERNAL COMBUSTION ENGINE

(75) Inventors: Takahide Mizuno, Wako (JP); Shusuke Akazaki, Wako (JP); Tetsuya Ishiguro, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1055 days.

(21) Appl. No.: 11/896,203

(22) Filed: Aug. 30, 2007

(65) Prior Publication Data

US 2008/0053404 A1    Mar. 6, 2008

(30) Foreign Application Priority Data

Aug. 31, 2006 (JP) .................. 2006-235569

(51) Int. Cl.
*F02P 5/153* (2006.01)

(52) U.S. Cl. .................. 701/111; 123/406.42

(58) Field of Classification Search ............. 123/406.22, 123/406.41, 406.42, 406.43; 701/110–111
See application file for complete search history.

(56) References Cited

U.S. PATENT DOCUMENTS

2007/0277780 A1* 12/2007 Akazaki et al. .......... 123/406.22

FOREIGN PATENT DOCUMENTS

| JP | 59-018268 A | | 1/1984 |
|---|---|---|---|
| JP | 61-16269 | * | 1/1986 |
| JP | 1-130057 | * | 5/1989 |
| JP | 2-230958 | * | 9/1990 |
| JP | 08-135483 A | | 5/1996 |
| JP | 2005-275489 A | | 10/2005 |
| JP | 2008-57438 | * | 3/2008 |

OTHER PUBLICATIONS

Japanese Office Action application No. 2006-235569 dated Jan. 18, 2011.

* cited by examiner

*Primary Examiner* — Hai H Huynh
(74) *Attorney, Agent, or Firm* — Squire, Sanders & Dempsey (US) LLP

(57) ABSTRACT

An ignition timing control system for an internal combustion engine, which is capable of ensuring both stability of control in a steady operating condition of the engine, and an excellent follow-up property of a controlled variable to a target value in a transient operating condition of the engine, even when the controlled variable contains a lot of high-frequency noise components. In the ignition timing control system, a maximum pressure angle-calculating section calculates a maximum pressure angle based on an in-cylinder pressure and a crank angle position. A target angle-calculating section calculates a target angle. A maximum pressure angle controller calculates a maximum pressure angle correction term with a control algorithm to which is applied a sliding mode control algorithm, using a value obtained by performing $\epsilon$-filtering on a switching function, such that the maximum pressure angle converges to the target angle. The ignition timing is calculated by adding corrected ignition timing to the value.

9 Claims, 8 Drawing Sheets

F I G. 7
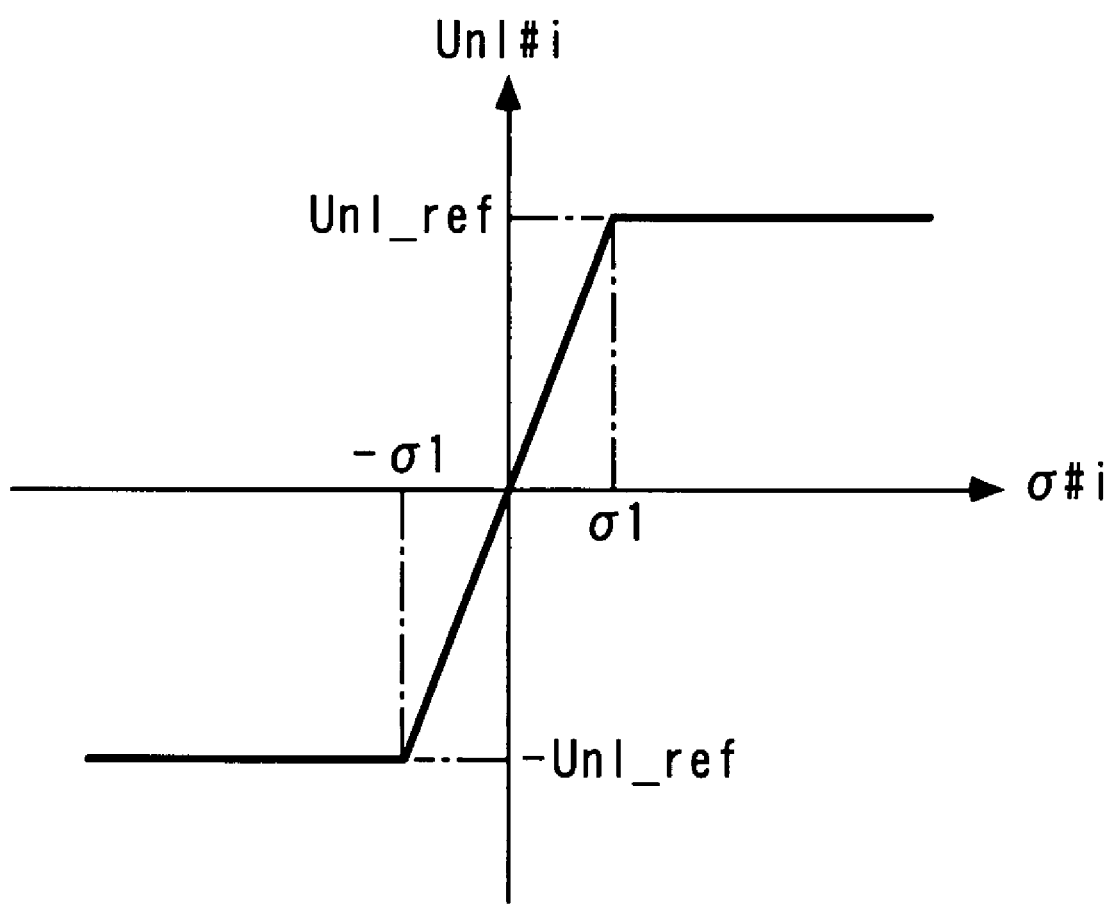

F I G. 8A
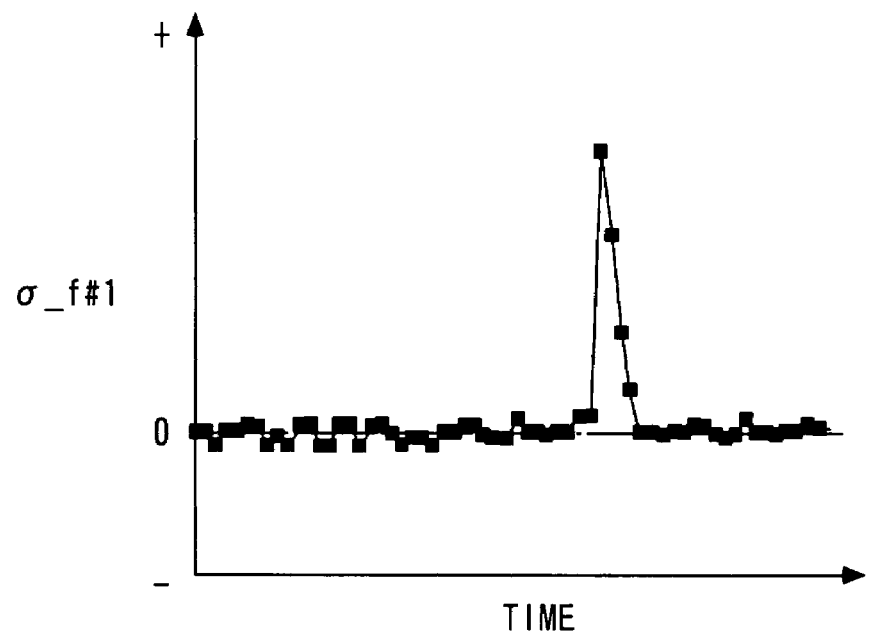
F I G. 8B
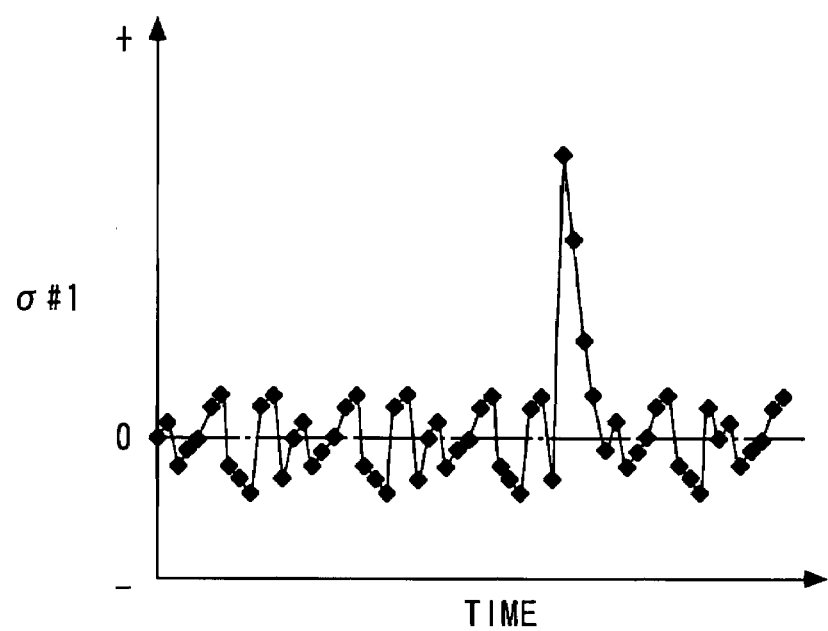

IGNITION TIMING CONTROL SYSTEM FOR INTERNAL COMBUSTION ENGINE

BACKGROUND OF THE INVENTION

1. Field of the Invention

This invention relates to an ignition timing control system for an internal combustion engine, for controlling ignition timing of the engine with a predetermined feedback control algorithm.

2. Description of the Related Art

Conventionally, as an ignition timing control system of this kind, the present assignee has already proposed an ignition timing control system disclosed in the publication of Japanese Patent No. 3779075. In the internal combustion engine, intake air amount control for increasing the amount of intake air is carried out during idling of the engine, and ignition timing is controlled by an ignition timing control system. In the ignition timing control, the rotational speed of the engine and a target rotational speed are set to a control variable and a target value thereof, respectively, and ignition timing as a control input is controlled with a predetermined feedback control algorithm such that the controlled variable converges to the target value. In this case, as the predetermined feedback control algorithm, there is employed an algorithm to which is applied a sliding mode control algorithm.

Further, in the control of ignition timing of the engine, a method is known which controls the ignition timing using pressure within a cylinder of the engine, i.e. in-cylinder pressure as a controlled variable.

According to the former ignition timing control system, the ignition timing is controlled with the predetermined feedback control algorithm such that the controlled variable converges to the target value. Therefore, when the in-cylinder pressure containing a lot of high-frequency noise components is used as a controlled variable as in the latter ignition timing control method, the ignition timing is feedback-controlled in an oscillating fashion, which can increase combustion variation. To sidestep this problem, it is envisaged to cause the controlled variable to be subjected to a low-pass filtering process or a moving average process. In this case, when there is hardly any change in the target value as in a steady operating condition of the engine, it is possible to control the controlled variable to the target value or its vicinity whereby control stability can be achieved, whereas when there is a large difference between the controlled variable and the target value as in a transient operating condition of the engine, there is a possibility that the follow-up property of the controlled variable to the target value is lowered.

SUMMARY OF THE INVENTION

It is an object of the invention to provide an ignition timing control system for an internal combustion engine, which is capable of achieving both control stability in a steady operating condition of the engine and an excellent follow-up property of a controlled variable to a target value in a transient operating condition of the engine, even when the controlled variable contains a lot of high-frequency noise components.

To attain the above object, in a first aspect of the present invention, there is provided an ignition timing control system for an internal combustion engine, comprising in-cylinder pressure-detecting means for detecting in-cylinder pressure of the engine, crank angle position-detecting means for detecting a crank angle position of the engine, maximum pressure angle-calculating means for calculating a crank angle position maximizing the in-cylinder pressure, as a maximum pressure angle, based on the detected in-cylinder pressure and the detected crank angle position, target angle-setting means for setting a target angle serving as a target to which the maximum pressure angle should be controlled, and ignition timing-calculating means for calculating ignition timing such that the calculated maximum pressure angle converges to the set target angle, with a control algorithm to which is applied a predetermined feedback control algorithm, while using a filtered value obtained by performing $\epsilon$-filtering on a function which contains a difference between one of the maximum pressure angle and the target angle and the other thereof and is representative of a convergence property of the maximum pressure angle to the target angle.

This ignition timing control system calculates ignition timing such that the calculated maximum pressure angle converges to the set target angle, with the control algorithm to which is applied the predetermined feedback control algorithm, while using the filtered value obtained by performing $\epsilon$-filtering on the function which contains the difference between one of the maximum pressure angle and the target angle and the other thereof and is representative of the convergence property of the maximum pressure angle to the target angle. In this case, since the maximum pressure angle is calculated based on the detected in-cylinder pressure and the detected crank angle position, the maximum pressure angle is under influence of both high-frequency noise components contained in a detected value of the in-cylinder pressure and high-frequency noise components contained in a detected value of the crank angle position. As a consequence, the function which contains the difference between one of the maximum pressure angle and the target angle and the other thereof and is representative of the convergence property of the maximum pressure angle to the target angle is under direct influence of the high-frequency noise components contained in the maximum pressure angle.

In general, in the case of $\epsilon$-filtering, when a filtered value is produced by performing $\epsilon$-filtering on an unprocessed value containing a lot of high-frequency noise components, the filtered value has a characteristic that it can suppress the influence of the high-frequency noise components of the unprocessed value in the steady operating condition of the engine, and ensure an excellent follow-up property to the unprocessed value in the transient operating condition of the engine. Therefore, when the ignition timing is calculated, as by this ignition timing control system, using the filtered value obtained by performing $\epsilon$-filtering on the function which contains the difference between one of the maximum pressure angle and the target angle and the other thereof and is representative of the convergence property of the maximum pressure angle to the target angle, it is possible to suppress the influence of the high-frequency noise components of the maximum pressure angle, thereby making it possible to ensure the stability of the control in the steady operating condition of the engine, while in the transient operating condition of the engine, even when a sharp increase in the difference between one of the maximum pressure angle and the target angle and the other thereof temporarily occurs, it is possible to ensure an excellent follow-up property of the maximum pressure angle to the target angle (it should be noted that throughout the specification, the term "function containing a difference" includes not only a function defined by a difference but also a function being a difference itself. Further, "to detect" e.g. in "to detect the in-cylinder pressure" and "to detect the crank angle position" includes not only to detect these directly e.g. by sensors but also to calculate values thereof based on other parameters).

Preferably, the predetermined feedback control algorithm is a predetermined algorithm to which is applied a sliding mode control algorithm, wherein the function is a switching function, wherein the filtered value is a switching function filtered value obtained by performing ε-filtering on the switching function, wherein the ignition timing is calculated with the control algorithm such that the ignition timing has a component of a total sum of a plurality of inputs calculated with the predetermined algorithm, and wherein the plurality of inputs include a first input calculated based on the switching function, and a second input calculated based on the switching function filtered value.

With this configuration of the preferred embodiment, the ignition timing is calculated such that the ignition timing has a component of the total sum of the plurality of inputs calculated with the predetermined algorithm to which is applied the sliding mode control algorithm. In general, in the sliding mode control algorithm, a control input is calculated as the total sum of a plurality of inputs including a reaching law input for causing the difference between the maximum pressure angle and the target angle to be on a switching line or a switching plane, an adaptive law input for suppressing the influence of a disturbance, and a non-linear input which acts as a feedforward term for quickly compensating for influence of a change in the difference in the steady operating condition of the engine, and at the same time, the reaching law input, the adaptive law input, and the non-linear input are all calculated based on the switching function. In this case, when the reaching law input and the adaptive law input are calculated using the switching function filtered value obtained by performing ε-filtering on the switching function, in place of the switching function, it is possible to properly ensure the above-described effects obtained by ε-filtering while ensuring the proper effects which are to be provided by the reaching law input and the adaptive law input, whereas when the non-linear input is calculated, the switching function filtered value has a phase difference from the switching function, which is caused by ε-filtering, and hence there is a fear that the proper effect of compensating for influence of a change in the difference in the steady operating condition of the engine cannot be obtained which is to be provided by the non-linear input.

In contrast, in the ignition timing control system, the first input is calculated based on the switching function, and the second input is calculated based on the switching function filtered value. Therefore, by inputting the first input as the non-linear input, and the second input as the reaching law input and/or the adaptive law input, it is possible to ensure both the effect of quickly compensating for influence of a change in the difference, which is caused by the non-linear input, and the effect of the suppression of the high-frequency noise components, which is caused by ε-filtering, thereby making it possible to further improve the accuracy of the ignition timing control in the steady operating condition of the engine.

Preferably, the predetermined feedback control algorithm is a predetermined algorithm to which is applied one of a PID control algorithm, a PI control algorithm, and a PD control algorithm, wherein the function is the difference between one of the maximum pressure angle and the target angle and the other thereof, wherein the filtered value is a difference filtered value obtained by performing ε-filtering on the difference, and wherein at least one of a proportional term, an integral term, and a differential term is calculated with the predetermined algorithm, using the difference filtered value.

With this configuration of the preferred embodiment, at least one of the proportional term, the integral term, and the differential term is calculated using the difference filtered value, with the predetermined algorithm to which is applied one of the PID control algorithm, the PI control algorithm, and the PD control algorithm. Therefore, it is possible to obtain the same advantageous effects when the ignition timing is controlled with a control algorithm to which is applied such a predetermined algorithm.

To attain the above object, in a second aspect of the present invention, there is provided a method of controlling ignition timing of an internal combustion engine, comprising an in-cylinder pressure-detecting step of detecting in-cylinder pressure of the engine, a crank angle position-detecting step of detecting a crank angle position of the engine, a maximum pressure angle-calculating step of calculating a crank angle position maximizing the in-cylinder pressure, as a maximum pressure angle, based on the detected in-cylinder pressure and the detected crank angle position, a target angle-setting step of setting a target angle serving as a target to which the maximum pressure angle should be controlled, and an ignition timing-calculating step of calculating ignition timing such that the calculated maximum pressure angle converges to the set target angle, with a control algorithm to which is applied a predetermined feedback control algorithm, while using a filtered value obtained by performing ε-filtering on a function which contains a difference between one of the maximum pressure angle and the target angle and the other thereof and is representative of a convergence property of the maximum pressure angle to the target angle.

With the configuration of the second aspect of the present invention, it is possible to obtain the same advantageous effects as provided by the first aspect of the present invention.

To attain the object, in a third aspect of the present invention, there is provided an engine control unit including a control program for causing a computer to execute a method of controlling ignition timing of an internal combustion engine, wherein the control program causes the computer to detect in-cylinder pressure of the engine, detect a crank angle position of the engine, calculate a crank angle position maximizing the in-cylinder pressure, as a maximum pressure angle, based on the detected in-cylinder pressure and the detected crank angle position, set a target angle serving as a target to which the maximum pressure angle should be controlled, and calculate ignition timing such that the calculated maximum pressure angle converges to the set target angle, with a control algorithm to which is applied a predetermined feedback control algorithm, while using a filtered value obtained by performing ε-filtering on a function which contains a difference between one of the maximum pressure angle and the target angle and the other thereof and is representative of a convergence property of the maximum pressure angle to the target angle.

With the configuration of the third aspect of the present invention, it is possible to obtain the same advantageous effects as provided by the first aspect of the present invention.

The above and other objects, features, and advantages of the invention will become more apparent from the following detailed description taken in conjunction with the accompanying drawings.

BRIEF DESCRIPTION OF THE DRAWINGS

FIG. 7 is a diagram showing an example of a map for use in calculating a non-linear input;

FIGS. 8A and 8B are timing diagrams showing changes in a switching function filtered value and a switching function, respectively, which are caused by execution of ignition timing control of a first cylinder in a steady operating condition of the engine.

DETAILED DESCRIPTION OF PREFERRED EMBODIMENTS

Figure 1:
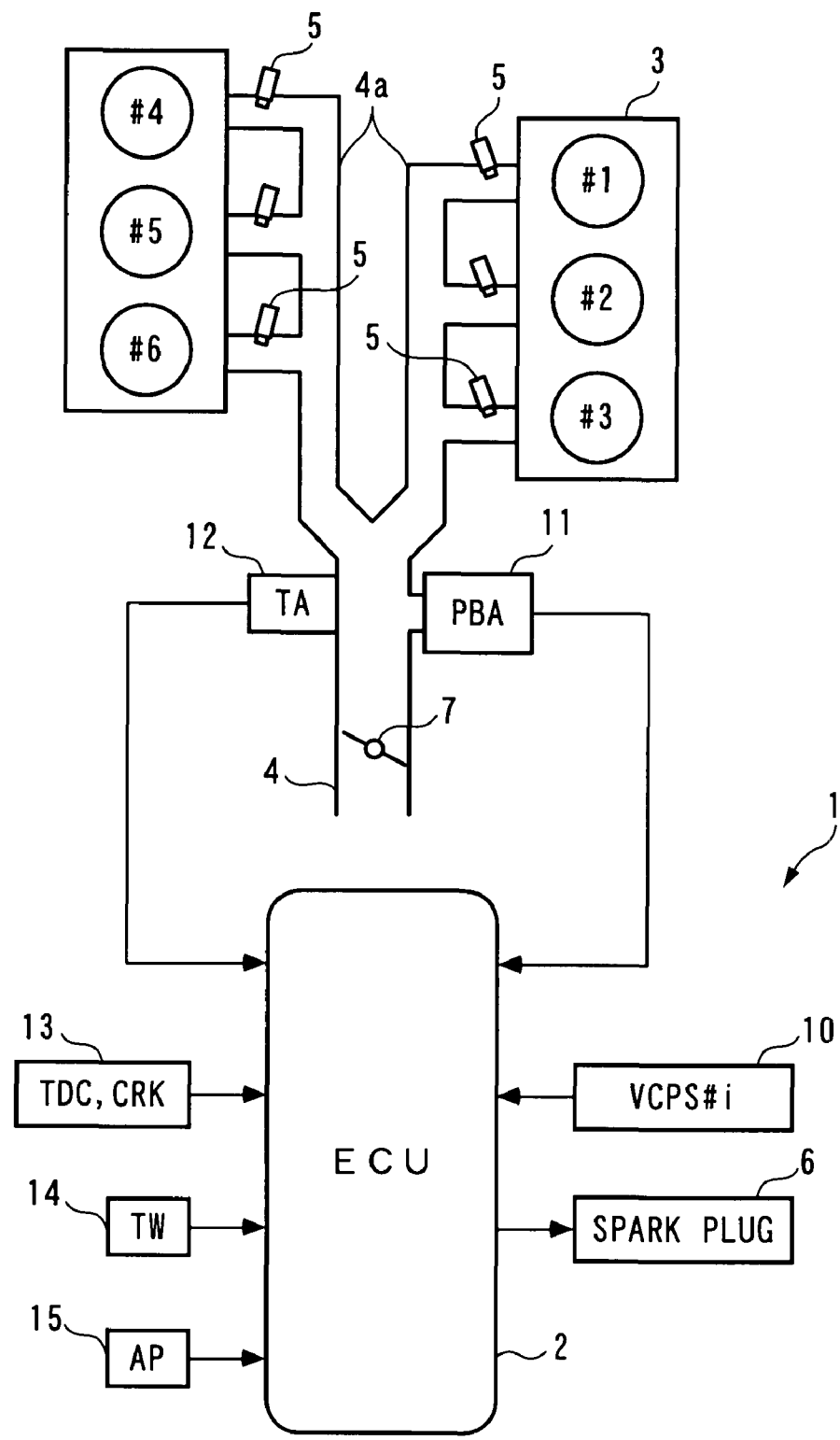
FIG. 1 is a schematic diagram of an ignition timing control system according to an embodiment of the present invention, and an internal combustion engine to which the ignition timing control system is applied.

Hereafter, an ignition timing control system for an internal combustion engine, according to an embodiment of the present invention, will be described with reference to the drawings. Referring first to FIG. 1, the ignition timing control system 1 according to the present embodiment includes an ECU 2, and as will be described hereinafter, the ECU 2 controls the ignition timing of the internal combustion engine (hereinafter simply referred to as "the engine") 3.

As shown in FIG. 1, the engine 3 is a V-type six-cylinder gasoline engine, and includes a right bank of first to third cylinders #1, #2, and #3, and a left bank of fourth to sixth cylinders #4, #5, and #6. An intake pipe 4 is connected to the first to sixth cylinders #1 to #6 (a plurality of cylinders) via intake manifolds 4a. Each intake manifold 4a has branch portions each having a fuel injection valve 5 inserted therein to face an intake port, not shown, of an associated one of the cylinders.

The fuel injection valve 5 is provided for each branch portion for injecting fuel therein, and is electrically connected to the ECU 2 such that the valve-opening time period and the valve-opening timing thereof are controlled by the ECU 2 depending on the operating conditions of the engine 3. That is, the ECU 2 performs fuel injection control of the fuel injection valve 5.

Spark plugs 6 (only one of which is shown in FIG. 1) and in-cylinder pressure sensors 10 (only one of which is shown in FIG. 1) are mounted through a cylinder head of the engine 3 for each cylinder. Each spark plug 6 as well is electrically connected to the ECU 2, and has its discharge state controlled by the ECU 2, for burning a mixture within an associated combustion chamber in ignition timing, described hereinafter. That is, the ECU 2 performs ignition timing control of the spark plug 6. The above-described fuel injection control and ignition timing control are carried out in the six cylinders #1 to #6 in the order of #1→#5→#3→#6→#2→#4.

On the other hand, each in-cylinder pressure sensor 10 (in-cylinder pressure-detecting means) is of a piezoelectric element type integrally formed with an associated one of the spark plugs 6. The in-cylinder pressure sensor 10 is bent by a change in pressure in each cylinder, i.e., in-cylinder pressure, thereby detecting the in-cylinder pressure to deliver a signal indicative of the sensed in-cylinder pressure to the ECU 2. The ECU 2 calculates an in-cylinder pressure PCYLF#i etc., based on the voltage value VCPS#i of the detection signal from the in-cylinder pressure sensor 10 (hereinafter referred to as "the detection voltage VCPS#i"). It should be noted that the suffix #i (=#1 to #6) in the detection voltage VCPS#i and the in-cylinder pressure PCYLF#i represents a cylinder number value indicative of a number assigned to each cylinder, and in the following description, "PCYLF#1" represents in-cylinder pressure in the first cylinder #1, while "PCYLF#i" represents in-cylinder pressures in all the six cylinders #1 to #6. This also applies to various parameters, described hereinafter, and the suffix #i in the various parameters are omitted as deemed appropriate.

An intake pipe pressure sensor 11 and an intake air temperature sensor 12 are arranged at respective locations downstream of a throttle valve 7 in the intake pipe 4. The intake pipe pressure sensor 11 is formed e.g. by a semiconductor pressure sensor, for detecting pressure PBA within the intake pipe 4 (hereinafter referred to as "the intake pipe pressure PBA") to deliver a detection signal indicative of the detected intake pipe pressure PBA to the ECU 2. The intake pipe pressure PBA is detected as an absolute pressure. Further, the intake air temperature sensor 12 detects the temperature TA of air flowing through the intake pipe 4 (hereinafter referred to as "the intake air temperature TA") to deliver a detection signal indicative of the detected intake air temperature TA to the ECU 2.

On the other hand, to the ECU 2 are connected a crank angle sensor 13, an engine coolant temperature sensor 14, and an accelerator pedal opening sensor 15. The crank angle sensor 13 (crank angle position-detecting means) is comprised of a magnet rotor and an MRE pickup, and delivers a CRK signal and a TDC signal, which are both pulse signals, to the ECU 2 in accordance with rotation of a crankshaft, not shown. Each pulse of the CRK signal is generated whenever the crankshaft rotates through a predetermined crank angle (e.g. 1°). The ECU 2 determines rotational speed NE of the engine 3 (hereinafter referred to as "the engine speed NE") based on the CRK signal.

Further, the TDC signal indicates that the piston, not shown, of each cylinder is in a predetermined crank angle position slightly before the TDC position at the start of the intake stroke, and each pulse of the TDC signal is generated whenever the crankshaft rotates through 120° in the six-cylinder engine in the present embodiment. The TDC signal associated with the first cylinder #1 is set such that it has a pulse width slightly longer than those of the other TDC signals associated with the second to sixth cylinders such that it can be distinguished from the other TDC signals. The ECU 2 calculates the crank angle position CA based on the TDC signal associated with the first cylinder #1 and the CRK signal, and calculates a maximum pressure angle $\theta$PMAX#i, described hereinafter, based on the crank angle position CA and the in-cylinder pressure PCYLF#i.

The engine coolant temperature sensor 14 senses an engine coolant temperature TW which is the temperature of an engine coolant circulating through a cylinder block of the engine 3, and delivers a signal indicative of the sensed engine coolant temperature TW to the ECU 2. The accelerator pedal opening sensor 15 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2.

The ECU 2 is implemented by a microcomputer comprised of a CPU, a RAM, a ROM, and an I/O interface (none of which are shown). The ECU 2 determines operating conditions of the engine 3, based on the detection signals delivered from the above-mentioned sensors 10 to 15, then executing e.g. ignition timing control of the spark plugs 6.

It should be noted that in the present embodiment, the ECU 2 corresponds to the in-cylinder pressure-detecting means, the crank angle position-detecting means, maximum pressure angle-calculating means, target angle-setting means, and ignition timing-calculating means.

Figure 2:
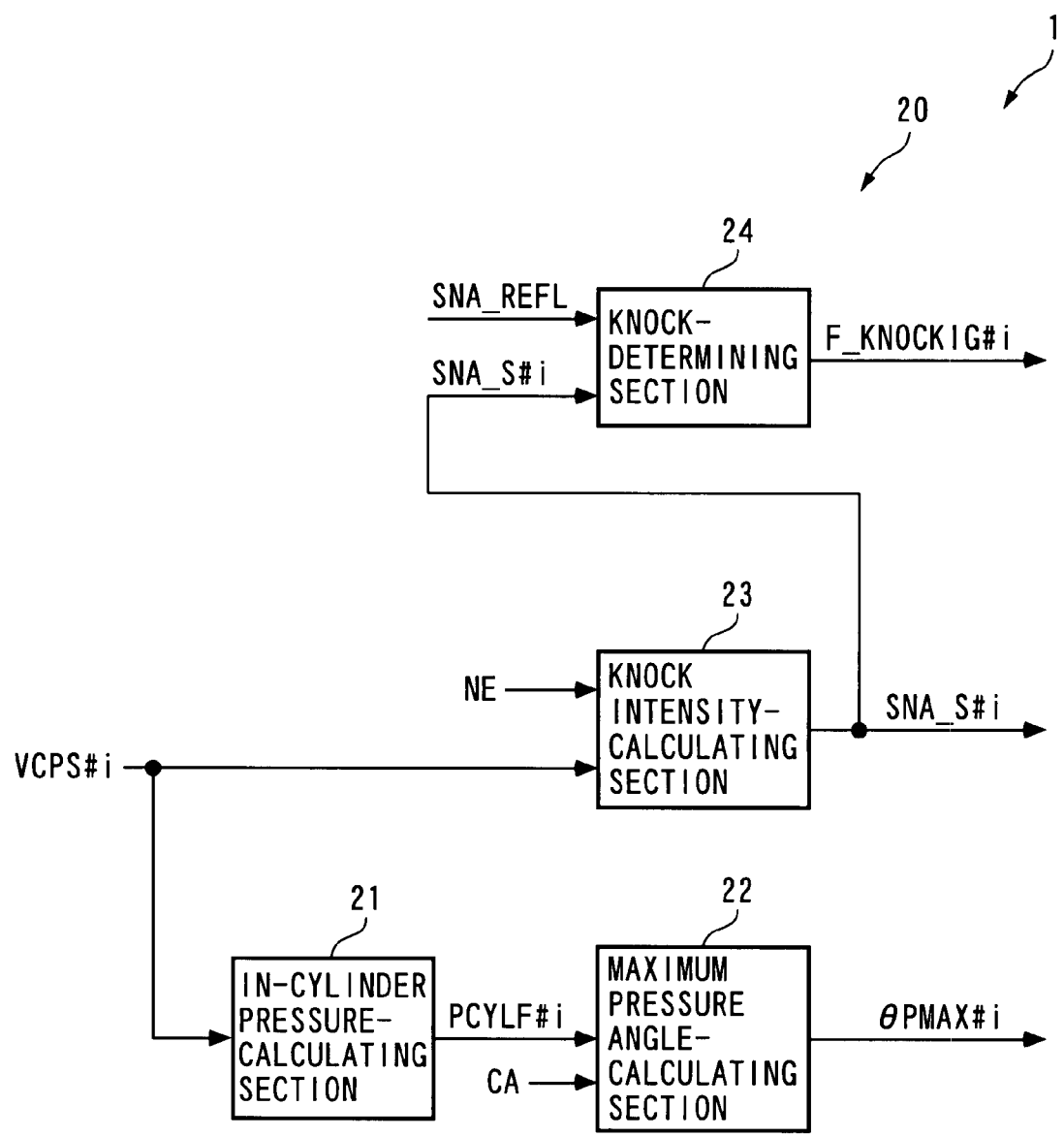
FIG. 2 is a schematic block diagram of a knock determining controller.
Figure 3:
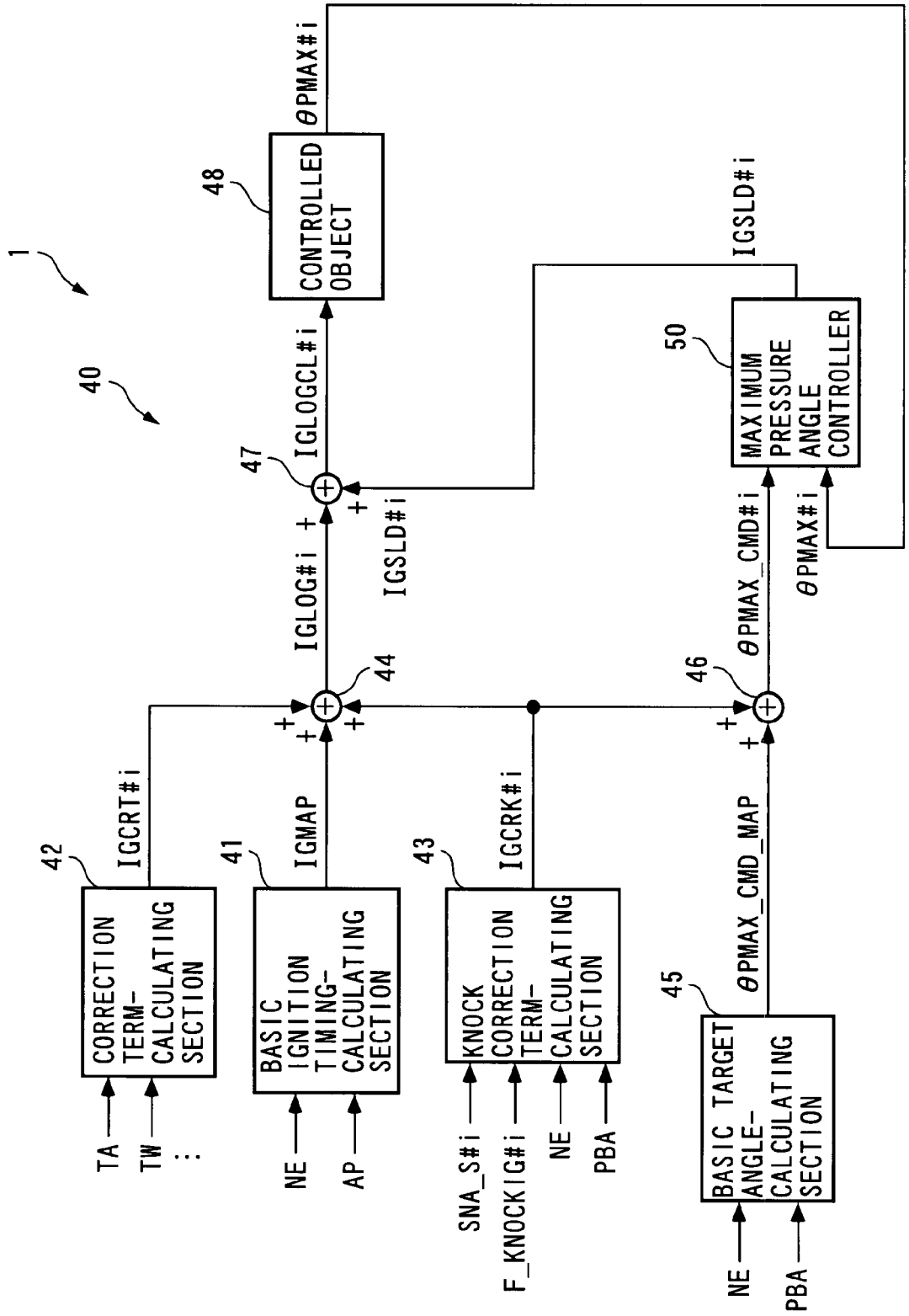
FIG. 3 is a schematic block diagram of an ignition timing controller.

Next, a description will be given of the outline of the configuration of the ignition timing control system 1 according to the present embodiment. As shown in FIGS. 2 and 3, the ignition timing control system 1 includes a knock determining controller 20 and an ignition timing controller 40. The controllers 20 and 40 are implemented by the ECU 2.

The knock determining controller 20 performs e.g. a knock-determining process on a cylinder-by-cylinder basis, and as shown in FIG. 2, is comprised of an in-cylinder pressure-calculating section 21, a maximum pressure angle-calculating section 22, a knock intensity-calculating section 23, and a knock-determining section 24.

First, the in-cylinder pressure-calculating section 21 (in-cylinder pressure-detecting means) carries out a predetermined filtering process and a predetermined model-fitting process on the detection voltage VCPS#i delivered from the in-cylinder pressure sensor 10, to thereby calculate the in-cylinder pressure PCYLF#i on a cylinder-by-cylinder basis.

Then, the maximum pressure angle-calculating section 22 (maximum pressure angle-calculating means) refers to a change in the in-cylinder pressure PCYLF#i within a maximum pressure angle calculation section, to thereby calculate the maximum pressure angle θPMAX#i on a cylinder-by-cylinder basis. The maximum pressure angle calculation section is a section between a start point defined as the ignition timing of a mixture and an end point defined as e crank angle position CA retarded from the ignition timing by a predetermined value. The maximum pressure angle θPMAX#i is calculated as a value of the crank angle position CA at which the in-cylinder pressure PCYLF#i takes a maximum value within the maximum pressure angle calculation section.

Further, the knock intensity-calculating section 23 calculates a knock intensity SNA_S#i based on the detection voltage VCPS#i and the engine speed NE on a cylinder-by-cylinder basis. The knock intensity SNA_S#i represents the intensity of knocking in the cylinder #i.

On the other hand, the knock-determining section 24 sets a value of a knock determination flag F_KNOCKING#i on a cylinder-by-cylinder basis based on the result of a comparison between the knock intensity SNA_S#i and a knock determination value SNA_REFL. More specifically, when SNA_S#i>SNA_REFL holds, the knock determination flag F_KNOCKING#i is set to 1, whereas when SNA_S#i≦SNA_REFL holds, the knock determination flag F_KNOCKING#i is set to 0.

As described above, the knock determining controller 20 calculates the knock intensity SNA_S#i, the knock determination flag F_KNOCKING#i, and the maximum pressure angle θPMAX#i, on a cylinder-by-cylinder basis.

Next, a description will be given of the above-described ignition timing controller 40 (ignition timing-calculating means). As described hereinafter, the ignition timing controller 40 calculates ignition timing IGLOGCL#i on a cylinder-by-cylinder basis, and inputs the ignition timing IGLOGCL#i as a control input to a controlled object 48 (see FIG. 3), to thereby control the maximum pressure angle θPMAX#i as a controlled variable. Referring to FIG. 3, the ignition timing controller 40 is comprised of a basic ignition timing-calcu-lating section 41, a correction term-calculating section 42, a knock correction term-calculating section 43, a corrected ignition timing-calculating section 44, a basic target angle-calculating section 45, a target angle-calculating section 46, an ignition timing-calculating section 47, and a maximum pressure angle controller 50.

It should be noted that in equations described hereinafter, discrete data with a symbol (k) indicates that it is data sampled or calculated at a predetermined control period ΔTk (at a repetition period synchronous with generation of each TDC signal pulse), and the symbol k indicates a position in the sequence of sampling or calculating cycles during which respective discrete data are obtained. Further, in the following description, the symbol (k) and the like provided for the discrete data are omitted as deemed appropriate.

First, the basic ignition timing-calculating section 41 calculates basic ignition timing IGMAP on a cylinder-by-cylinder basis. More specifically, the basic ignition timing-calculating section 41 calculates a demanded torque PMCMD by searching a map, not shown, according to the engine speed NE and the accelerator pedal opening AP, and then calculates the basic ignition timing IGMAP by searching a map, not shown, according to the demanded torque PMCMD and the engine speed NE.

The correction term-calculating section 42 calculates a correction term IGCRT#i on a cylinder-by-cylinder basis by searching respective associated maps, not shown, according to parameters, such as the intake air temperature TA and the engine coolant temperature TW.

Further, the knock correction term-calculating section 43 calculates a knock correction term IGCRK#i on a cylinder-by-cylinder basis according to the knock determination flag F_KNOCKING#i, the knock intensity SNA_S#i, the engine speed NE, and the intake pipe pressure PBA.

Then, the corrected ignition timing-calculating section 44 calculates corrected ignition timing IGLOG#i by the following equation (1):

$$IGLOG\#i(k)=IGMAP(k)+IGCRT\#i(k)+IGCRK\#i(k) \qquad (1)$$

Figure 4:
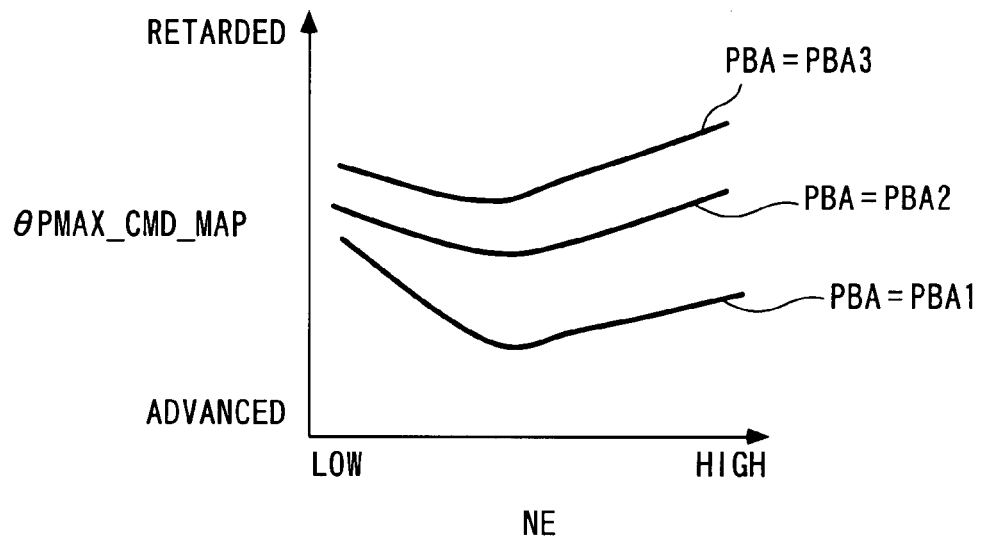
FIG. 4 is a diagram showing an example of a map for use in calculating a basic target angle.

On the other hand, the basic target angle-calculating section 45 calculates a basic target angle θPMAX_CMD_MAP by searching a map shown in FIG. 4, according to the engine speed NE and the intake pipe pressure PBA. In FIG. 4, PBA1 to 3 represent predetermined values of the intake pipe pressure PBA, which satisfy the relationship of PBA1<PBA2<PBA3.

In this map, as the intake pipe pressure PBA is higher, the basic target angle θPMAX_CMD_MAP is set to a more retarded value, and in a high engine speed region, as the engine speed NE is higher, the basic target angle θPMAX_C-MD_MAP is set to a more retarded value. This is because as the load on the engine 3 is higher, or the engine speed NE is higher in the high engine speed region, the knock margin is reduced. It should be noted that the basic target angle θPMAX_CMD_MAP is set to such a value that when the ignition timing is controlled such that the maximum target angle θPMAX#i becomes equal to the basic target angle θPMAX_CMD_MAP, the ignition timing is controlled to MBT (Minimum advance for Best Torque).

Next, the target angle-calculating section 46 (target angle-setting means) calculates a target angle θPMAX_CMD#i by the following equation (2):

$$\theta PMAX\_CMD\#i(k)=\theta PMAX\_CMD\_MAP(k)+IGCRK\#i(k) \qquad (2)$$

Further, as described hereinafter, the maximum pressure angle controller 50 calculates a maximum pressure angle correction term IGSLD#i on a cylinder-by-cylinder basis according to the maximum pressure angle θPMAX#i and the target angle θPMAX_CMD#i. The ignition timing-calculating section 47 calculates the ignition timing IGLOGCL#i on a cylinder-by-cylinder basis by the following equation (3):

$$IGLOGCL\#i(k) = IGLOG\#i(k) + IGSLD\#i(k) \quad (3)$$

Figure 5:
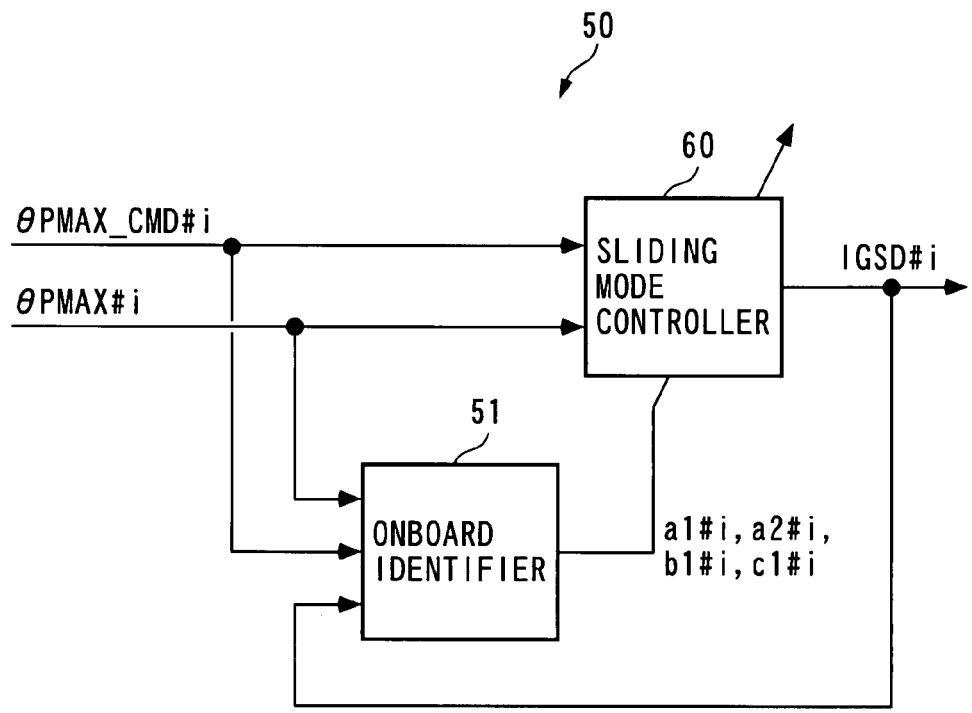
FIG. 5 is a schematic block diagram of a maximum pressure angle controller.

Next, a description will be given of the maximum pressure angle controller 50 described above. As shown in FIG. 5, the maximum pressure angle controller 50 is comprised of an onboard identifier 51, and a sliding mode controller 60.

The onboard identifier 51 calculates model parameters a1#i, a2#i, b1#i, and c1#i of a model, described hereinafter, with an identification algorithm expressed by the following equations (4) to (10):

$$\theta\#i(k) = \theta\#i(k-1) + KP\#i(k) \cdot ide\#i(k) \quad (4)$$

$$\theta\#i(k)^T = [a1\#i(k) \; a2\#i(k) \; b1\#i(k) \; c1\#i(k)] \quad (5)$$

$$ide\#i(k) = \theta PMAX\#i(k) - \theta PMAX\_HAT\#i(k) \quad (6)$$

$$\theta PMAX\_HAT\#i(k) = \theta\#i(k-1)^T \cdot \zeta\#i(k) \quad (7)$$

$$\zeta\#i(k)^T = [\theta PMAX\#i(k-1) \; \theta PMAX\#i(k-2) \; IGSLD\#i(k-1) \; 1] \quad (8)$$

$$KP\#i(k) = \frac{P\#i(k) \cdot \zeta\#i(k)}{1 + \zeta\#i(k)^T \cdot P\#i(k) \cdot \zeta\#i(k)} \quad (9)$$

$$P\#i(k+1) = \frac{1}{\lambda_1}\left(I - \frac{\lambda_2 P\#i(k) \cdot \zeta\#i(k) \cdot \zeta\#i(k)^T}{\lambda_1 + \lambda_2 \cdot \zeta\#i(k)^T \cdot P\#i(k) \cdot \zeta\#i(k)}\right) P\#i(k) \quad (10)$$

In the above equation (4), θ#i represents a model parameter vector including the model parameters a1#i, a2#i, b1#i, and c1#i as elements thereof, and a transposed matrix of the model parameter vector is defined by an equation (5). Further, in the equation (4), KP#i represents a vector of a gain coefficient, and ide#i represents a following error. The following error ide#i is calculated by the aforementioned equations (6) to (8). In the equation (6), θPMAX_HAT#i represents an identified value of θPMAX#i, and is calculated by the equation (7). ζ#i in the equation (7) represents a vector a transposed matrix of which is defined by an equation (15).

Furthermore, the vector KP#i of the gain coefficient is calculated by the equation (9), and P#i in the equation (9) represents a square matrix of order 4 defined by the equation (10). In the equation (10), I represents a unit matrix of order 4, and λ1 and λ2 represent weight parameters.

In the identification algorithm configured as above, one of the following four identification algorithms is selected according to settings of the weighting parameters λ1 and λ2 in the equation (10):

λ1=1, λ2=0: fixed gain algorithm;
λ1=1, λ2=1: least-squares method algorithm;
λ1=1, λ2=λ: progressively decreasing gain algorithm; and
λ1=λ2=1: weighted least-squares method algorithm, wherein λ represents a predetermined value set such that 0<λ<1 holds.

It should be noted that in the onboard identifier 51 according to the present embodiment, the weighted least-squares method algorithm is employed so as to optimally secure both the accuracy of identification and the follow-up rate of the model parameter vector θ#i to an optimal value.

Next, a description will be given of the sliding mode controller 60. As will be described hereinafter, the sliding mode controller 60 calculates the maximum pressure angle correction term IGSLD#i as a value for causing the maximum pressure angle θPMAX#i to converge to the target angle θPMAX_CMD#i with an algorithm formed by a combination of a sliding mode control algorithm and an ε-filtering algorithm.

Figure 6:
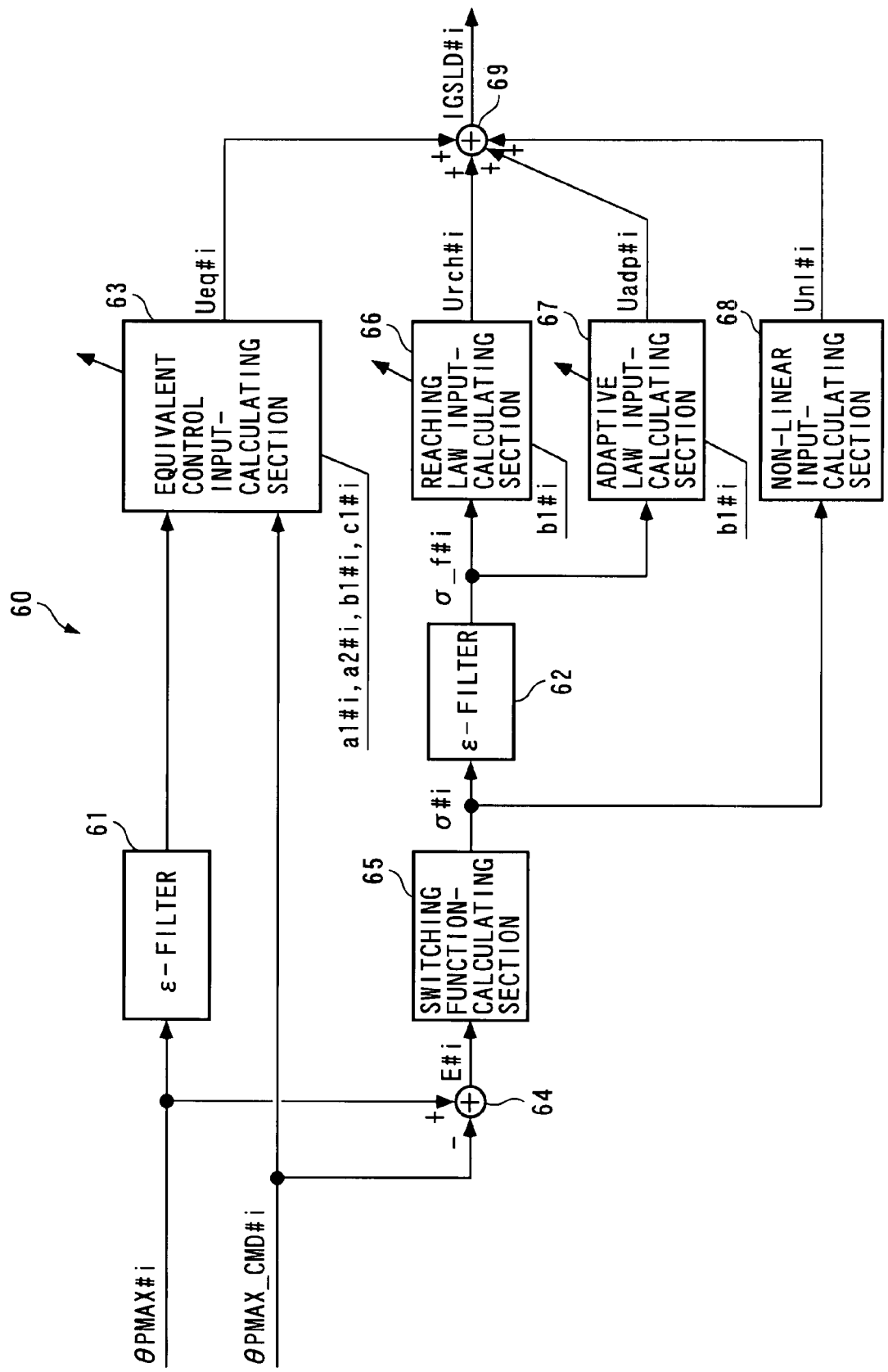
FIG. 6 is a schematic block diagram of a sliding mode controller.

As shown in FIG. 6, the sliding mode controller 60 is comprised of two ε-filters 61 and 62, an equivalent control input-calculating section 63, a difference-calculating section 64, a switching function-calculating section 65, a reaching law input-calculating section 66, an adaptive law input-calculating section 67, a non-linear input-calculating section 68, and a maximum pressure angle correction term-calculating section 69.

First, the ε-filter 61 performs ε-filtering on the maximum pressure angle θPMAX#i to thereby calculate a maximum pressure angle filtered value θPMAX_f#i. More specifically, the maximum pressure angle filtered value θPMAX_f#i is calculated with an δ-filtering algorithm expressed by the following equations (11) to (14). It should be noted that in the following equation (11), n is an integer, m an integer which satisfies the relationship of m≧_2f+1 (f is an integer), and ε a predetermined positive value.

$$\theta PMAX\_f\#i(k) = \frac{1}{n+1}\sum_{j=0}^{n} F\varepsilon(\theta PMAX\#i(k-mj), \quad (11)$$

$$\theta PMAX\#i(k))$$

WHEN (12)
$$\theta PMAX\#i(k-mj) > \theta PMAX\#i(k) + \varepsilon$$
$$F\varepsilon(\theta PMAX\#i(k-mj), \theta PMAX\#i(k)) = \theta PMAX\#i(k)$$

WHEN (13)
$$\theta PMAX\#i(k) - \varepsilon \leq \theta PMAX\#i(k-mj) \leq \theta PMAX\#i(k) + \varepsilon$$
$$F\varepsilon(\theta PMAX\#i(k-mj), \theta PMAX\#i(k)) = \theta PMAX\#i(k-mj)$$

WHEN (14)
$$\theta PMAX\#i(k-mj) < \theta PMAX\#i(k) - \varepsilon$$
$$F\varepsilon(\theta PMAX\#i(k-mj), \theta PMAX\#i(k)) = \theta PMAX\#i(k)$$

Then, the equivalent control input-calculating section 63 calculates an equivalent control input Ueq#i by the following equation (15) using the maximum pressure angle filtered value θPMAX_f#i, the target angle θPMAX_CMD#i, and the model parameters a1#i, a2#i, b1#i, and c1#i calculated by the onboard identifier 51. It should be noted that in the following equation (15), POLE represents a switching function set to a value which satisfies the relationship of −1<POLE<0.

$$Ueq\#i(k) = \frac{1}{b1\#i}\{(1 - POLE - a1\#i) \cdot \theta PMAX\_f\#i(k) + \quad (15)$$

$$(POLE - a2\#i) \cdot \theta PMAX\_f\#i(k-1) +$$

$$\theta PMAX\_CMD\#i(k+1) + (POLE - 1) \cdot \theta PMAX\_CMD\#i(k) -$$

$$POLE \cdot \theta PMAX\_CMD\#i(k-1)0c1\#i\}$$

Further, the difference-calculating section 64 calculates a difference E#i by the following equation (16):

$$E\#i(k) = \theta PMAX\#i(k) - \theta PMAX\_CMD\#i(k) \quad (16)$$

Furthermore, the switching function-calculating section 65 calculates a switching function σ#i by the following equation (17):

$$\sigma\#i(k) = E\#i(k) + POLE \cdot E\#i(k-1) \quad (17)$$

Then, the ε-filter 62 performs ε-filtering on the switching function σ#i to thereby calculate a switching function filtered value σ_f#i. More specifically, similarly to the above-described ε-filter 61, the ε-filter 62 calculates the switching function filtered value σ_f#i with an ε-filtering algorithm expressed by the following equations (18) to (21).

$$\sigma\_f\#i(k) = \frac{1}{n+1} \sum_{j=0}^{n} F\varepsilon(\sigma\#i(k-mj), \sigma\#i(k)) \tag{18}$$

WHEN (19)

$\sigma\#i(k-mj) > \sigma\#i(k) + \varepsilon$ $F\varepsilon(\sigma\#i(k-mj), \sigma\#i(k)) = \sigma\#i(k)$

WHEN (20)

$\sigma\#i(k) - \varepsilon \leq \sigma\#i(k-mj) \leq \sigma\#i(k) + \varepsilon$ $F\varepsilon(\sigma\#i(k-mj), \sigma\#i(k)) = \sigma\#i(k-mj)$

WHEN (21)

$\sigma\#i(k-mj) < \sigma\#i(k) - \varepsilon$ $F\varepsilon(\sigma\#i(k-mj), \sigma\#i(k)) = \sigma\#i(k)$ Further, the reaching law input-calculating section 66 calculates a reaching law input Urch#i by the following equation (22). In the equation (22), Krch represents a reaching law gain which is set to a predetermined value.

$$Urch\#i(k) = \frac{-Krch}{b1\#i} \cdot \sigma\_f\#i(k) \tag{22}$$

The adaptive law input-calculating section 67 calculates an adaptive law input Uadp#i by the following equation (23). In the equation (23), Kadp represents an adaptive law gain which is set to a predetermined value.

$$Uadp\#i(k) = \frac{-kadp}{b1\#i} \cdot \sum_{j=1}^{k} \sigma\_f\#i(j) \tag{23}$$

The non-linear input-calculating section 68 calculates a non-linear input Unl#i by searching a map shown in FIG. 7, according to the switching function σ#i. In FIG. 7, σ1 represents a predetermined value of the switching function σ#i, and Unl_ref represents a predetermined value of the non-linear input Unl#i.

In this map, when −σ1≦σ#i≦σ1 holds, the non-linear input Unl#i is set to a larger value as the switching function σ#i is larger, whereas when σ1<|σ#i| holds, the non-linear input Unl#i is set such that |Unl#i|=Unl_ref holds. This is because when the absolute value of the switching function σ#i is small, that is, when the degree of deviation of the maximum pressure angle θPMAX#i from the target angle θPMAX_CMD#i is small as in a steady operating condition of the engine 3, the non-linear input Unl#i is set as above to thereby increase the convergence property of the maximum pressure angle θPMAX#i to the target angle θPMAX_CMD#i, whereas when the degree of deviation of the maximum pressure angle θPMAX#i from the target angle θPMAX_CMD#i is large, the non-linear input Unl#i is set to a fixed value to provide a low gain input, which is lower in the degree of influence than other inputs, to thereby ensure stability of control.

Then, the maximum pressure angle correction term-calculating section 69 calculates the maximum pressure angle correction term IGSLD#i on a cylinder-by-cylinder basis by the following equation (24):

$$IGSLD\#i(k)=Ueq\#i(k)+Urch\#i(k)+Uadp\#i(k)+Unl\#i(k) \tag{24}$$

It should be noted that in the present embodiment, the maximum pressure angle correction term IGSLD#i corresponds to the total sum of a plurality of inputs, the non-linear input Unl#i to a first input, and the reaching law input Urch#i and the adaptive law input Uadp#i to a second input.

As described hereinabove, the sliding mode controller 60 according to the present embodiment calculates the maximum pressure angle correction term IGSLD#i with the algorithm formed by the combination of the sliding mode control algorithm and the ε-filtering algorithm, as a value for causing the maximum pressure angle θPMAX#i to converge to the target angle θPMAX_CMD#i.

It should be noted that the aforementioned equations (15) to (24) are derived as follows: Assuming a controlled object to which the maximum pressure angle correction term IGSLD#i is input as a control input and from which the maximum pressure angle θPMAX#i is output as a controlled variable, when the controlled object is modeled into a discrete-time system model, the following equation (25) is obtained.

$$\theta PMAX\#i(k+1) = a1\#i \cdot \theta PMAX\#i(k) + \tag{25}$$

$$a2\#i \cdot \theta PMAX\#i(k-1) + b1\#i \cdot IGSLD\#i(k) + c1\#i$$

When the sliding mode control theory is applied to this model, equations are derived in which the switching function σ#i is substituted for the switching function filtered value σ_f#i in the aforementioned equations (15) to (17) and (22) to (24). When the ε-filtering algorithm is applied to these derived equations, the equations (15) to (24) are obtained.

Next, a description will be given of examples of the results of the ignition timing control executed by the ignition timing control system 1 configured as above according to the present embodiment. FIGS. 8A and 8B show changes in a switching function filtered value σ_f#1 and a switching function σ#1, respectively, when the ignition timing control of the first cylinder #1 is performed in the steady operating condition of the engine 3. As is clear from a comparison between FIGS. 8A and 8B, the switching function filtered value σ_f#1 contains less high-frequency noise components than the switching function σ#1, and hence it is understood that suppression of the high-frequency noise components is achieved by ε-filtering when the engine 3 is in the steady operating condition.

Figure 9A:
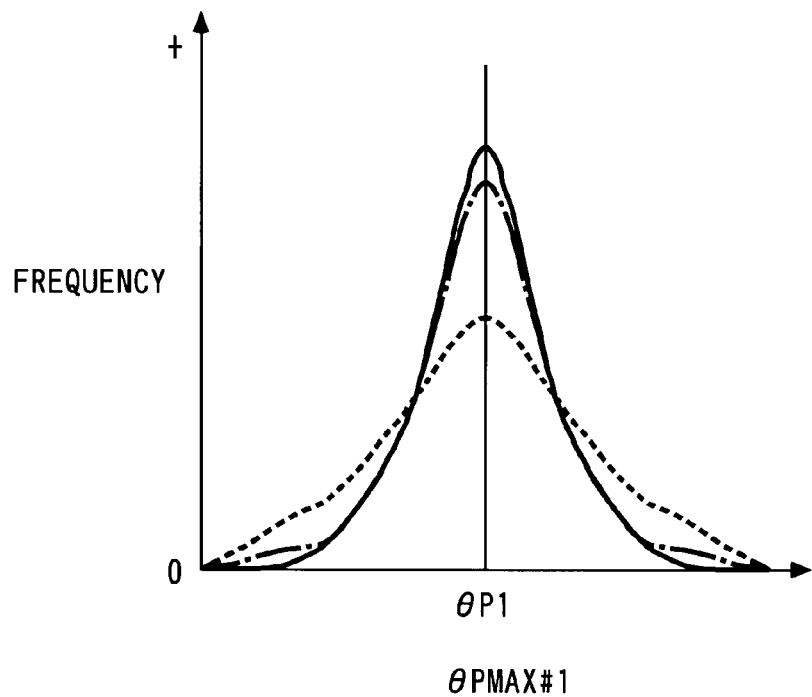
FIGS. 9A and 9B are diagrams showing examples of control results of a maximum pressure angle and ignition timing, respectively, which are obtained when a target angle is set to a predetermined value in the steady operating condition of the engine, and the ignition timing control of the first cylinder is carried out such that the maximum pressure angle converges to the predetermined value.
Figure 9B:
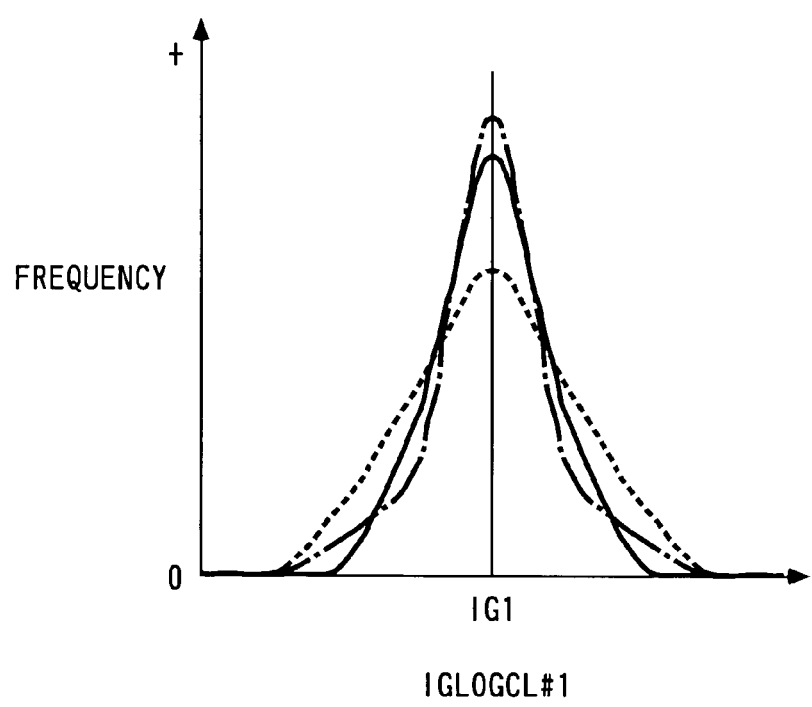

Further, FIGS. 9A and 9B show examples of the control results of a maximum pressure angle θPMAX#1 and ignition timing IGLOGCL#1, respectively, which are obtained when a target angle θPMAX_CMD#1 is set to a predetermined value θP1 (value at which the MBT can be obtained) in the steady operating condition of the engine 3, and the ignition timing control of the first cylinder #1 is carried out such that the maximum pressure angle θPMAX#1 converges to the predetermined value θP1. In FIGS. 9A and 9B, the vertical axes represent the frequency (%) of generation of the maximum pressure angle θPMAX#1 and that of the ignition timing IGLOGCL#1, respectively, and IG1 in FIG. 9B represents a value of the ignition timing IGLOGCL#1 obtained when the maximum pressure angle θMAX#1 is controlled to the predetermined value θP1, that is, an MBT ignition timing-equivalent value which is equivalent to the ignition timing of the MBT.

Further, In FIGS. 9A and 9B, curves indicated by solid lines represent examples of the respective control results in which the maximum pressure angle correction term IGSLD#1 calculated by the maximum pressure angle controller 50 of the present embodiment is used for the ignition timing control of the first cylinder #1, and curves indicated by one-dot chain lines represent examples of the respective control results in which for comparison with the above control results, a non-linear input Unl#1 as well is calculated using the switching function filtered value σ_f#1 (Unl#1 is calculated using a map in which the horizontal axis in FIG. 7 is replaced by the switching function filtered value σ_f#1) . Further, in FIGS. 9A and 9B, curves indicated by broken lines represent examples of the respective control results in which the maximum pressure angle correction term IGSLD#1 is calculated by calculating three inputs Ueq#1, Urch#1, and Uadp#1 using the switching function u#1 in place of the switching function filtered value σ_f#1, and adding the non-linear input Unl#1 calculated according to the switching function σ#1 to the total sum of the three inputs Ueq#1, Urch#1, and Uadp#1 (i.e. in which the ε-filters 61 and 62 are omitted).

Referring first to FIG. 9A, the maximum pressure angle θPMAX#1 is controlled to the predetermined value θP1 or its vicinity more often when the switching function filtered value σ_f#1 is used (the example of the control result indicated by the one-dot chain line) than when the switching function σ#1 is used without ε-filtering (the example of the control result indicated by the broken line). From this, it is understood that the convergence property of the maximum pressure angle θPMAX#1 to the target angle θPMAX_CMD#1 is improved by the effect of suppressing the high-frequency noise components by ε-filtering.

Further, the maximum pressure angle θPMAX#1 is controlled to the predetermined value θP1 or its vicinity more often when the switching function σ#1 is used in the calculation of the non-linear input Unl#1, (the example of the control result indicated by the solid line) than when the switching function filtered value σ_f#1 is used in the calculation of the same (the example of the control result indicated by the one-dot chain line), and it is understood that the convergence property of the maximum pressure angle θPMAX#1 to the target angle θPMAX_CMD#1 is further enhanced. This is because when the non-linear input Unl#1 is calculated using the switching function filtered value σ_f#1, the switching function filtered value σ_f#1 has a phase difference from the switching function σ#1 caused by ε-filtering, which reduces the proper effect of quickly compensating for influence of a change in the difference E#1 in the steady operating condition of the engine 3, which should be caused by the action of the non-linear input Unl#1.

Further, referring to FIG. 9B, the ignition timing IGLOGCL#1 is controlled to the MBT ignition timing-equivalent value IG1 or its vicinity more often when the switching function filtered value σ_f#1 is used (the example of the control result indicated by the one-dot chain line) than when the switching function σ#1 is used without ε-filtering (the example of the control result indicated by the broken line). From this, it is understood that the accuracy and the stability of the ignition timing control are improved thanks to the effect of suppressing the high-frequency noise components, which is caused by ε-filtering. Furthermore, as a whole, the ignition timing IGLOGCL#1 is controlled to the MBT ignition timing-equivalent value IG1 or its vicinity more often when the switching function σ#1 is used in the calculation of the non-linear input Unl#1 (the example of the control result indicated by the solid line) than when the switching function filtered value σ_f#1 is used in the calculation of the same (the example of the control result indicated by the one-dot chain line), and it is understood that further improvement of the accuracy and the stability of the ignition timing control is caused by the non-linear input Unl#1. This is for the above-described reason.

As described above, according to the ignition timing control system 1 of the present embodiment, the ignition timing IGLOGCL#i is calculated as the sum of the maximum pressure angle correction term IGSLD#i and the corrected ignition timing IGLOG#i, and therefore the ignition timing IGLOGCL#i is controlled such that the maximum pressure angle θPMAX#i converges to the target angle θPMAX_CMD#i. The maximum pressure angle correction term IGSLD#i is calculated as the total sum of the four inputs Ueq#i, Urch#i, Uadp#i, and Unl#i, and the reaching law input Urch#i and the adaptive law input Uadp#i are calculated based on the switching function filtered value σ_f#i which is obtained by performing ε-filtering on the switching function U#i. Further, the non-linear input Unl#i is calculated based on the switching function σ#i.

Now, since the maximum pressure angle θPMAX#i is calculated based on the respective detection signals from the in-cylinder pressure sensor 10 and the crank angle sensor 13, it is under double influence of both high-frequency noise components contained in a value of in-cylinder pressure detected by the in-cylinder pressure sensor 10 and high-frequency noise components contained in a value of crank angle position detected by the crank angle sensor 13. As a consequence, the switching function σ#i defined by the difference E#i between the maximum pressure angle θPMAX#i and the target angle θPMAX_CMD#i is under direct influence of high-frequency noise components contained in the maximum pressure angle θPMAX#i.

Further, as described hereinabove, the ε-filter 62 performs ε-filtering on the switching function σ#i containing a lot of high-frequency noise components to give the switching function filtered value σ_f#i. The switching function filtered value σ_f#i is thus calculated as a value which can suppress the influence of the high-frequency noise components of the switching function σ#i in the steady operating condition of the engine 3, and ensure an excellent follow-up property to the switching function σ#i in the transient operating condition of the engine 3. Therefore, by calculating the reaching law input Urch#i and the adaptive law input Uadp#i using the switching function filtered value σ_f#i calculated as above, it is possible, when the engine 3 is in the steady operating condition, to suppress the influence of the high-frequency noise components of the maximum pressure angle θPMAX#i, thereby making it possible to ensure the stability of the ignition timing control, whereas when the engine 3 is in the transient operating condition, even when a sharp increase in the difference E#i between the maximum pressure angle θPMAX#i and the target angle θPMAX_CMD#i temporarily occurs, it is possible to ensure an excellent follow-up property of the maximum pressure angle θPMAX#i to the target angle θPMAX_CMD#i.

Furthermore, as described above, when the non-linear input Unl#i is calculated based on the switching function filtered value σ_f#i, the switching function filtered value σ_f#i has a phase difference from the switching function σ#i, which is caused by ε-filtering, and therefore, there is a fear that the proper effect of quickly compensating for influence of a change in the difference E#1 in the steady operating condition of the engine 3 is reduced which should be caused by the action of the non-linear input Unl#1. In contrast, in the present embodiment, since the non-linear input Unl#i is calculated using the switching function σ#i, it is possible to quickly compensate for influence of a change in the difference E#i in the steady operating condition of the engine 3, by the non-linear input Unl#i.

As described hereinabove, during the ignition timing control in the steady operating condition of the engine 3, it is possible to ensure both the effect of quickly compensating for influence of a change in the difference E#i, which is caused by the non-linear input Unl#i, and the effect of the suppression of the high-frequency noise components, which is caused by ϵ-filtering, thereby making it possible to further improve the accuracy of ignition timing control in the steady operating condition of the engine 3.

Moreover, in the present embodiment, the equivalent control input Ueq#i is calculated using the maximum pressure angle filtered value θPMAX_f#i which is obtained by performing ϵ-filtering on the maximum pressure angle θPMAX#i. This makes it possible to obtain the effect of suppressing the high-frequency noise components through ϵ-filtering in the steady operating condition of the engine 3 and the follow-up property of the maximum pressure angle θPMAX#i to the target angle θPMAX_CMD#i in the transient operating condition of the engine 3. This makes it possible to further improve the accuracy of the ignition timing control both in the steady operating condition and the transient operating condition.

Although in the above-described embodiment, the ignition timing IGLOGCL#i is calculated using a value obtained by subtracting the target angle θPMAX_CMD#i from the maximum pressure angle θPMAX#i as the difference E#i, by way of example, instead of this, the ignition timing IGLOGCL#i may be calculated by using a value (θPMAX_CMD#i−θPMAX#i) obtained by subtracting the maximum pressure angle θPMAX#i from the target angle θPMAX_CMD#i, as the difference E#i.

Further, although in the above-described embodiment, the equivalent control input Ueq#i is calculated using the maximum pressure angle filtered value θPMAX_f#i obtained by performing ϵ-filtering on the maximum pressure angle θPMAX#i, by way of example, the equivalent control input Ueq#i may be calculated by using the maximum pressure angle θPMAX#i without ϵ-filtering. In short, the ϵ-filter 61 in FIG. 6 may be omitted.

Furthermore, although in the above-described embodiment, the algorithm expressed by the equations (4) to (24) is used as the predetermined algorithm to which is applied the sliding mode control algorithm, by way of example, this is not limitative, but any algorithm may be used as the predetermined algorithm of the present invention insofar as the sliding mode control algorithm is applied thereto. For example, the aforementioned equations (11) to (24) may be used as the predetermined algorithm while using the model parameters a1#i, a2#i, b1#i, and c1#i set to predetermined fixed values.

Further, although in the above-described embodiment, both the reaching law input Urch#i and the adaptive law input Uadp#i are calculated using the switching function filtered value σ_f#i, by way of example, this is not limitative, but one of the two inputs Urch#i and Uadp#i may be calculated using the switching function filtered value σ_f#i, while the other may be calculated using the switching function σ#i.

On the other hand, although in the above-described embodiment, a predetermined algorithm to which is applied the sliding mode control algorithm is used as the predetermined feedback control algorithm, by way of example, this is not limitative, but any algorithm may be used as the predetermined feedback control algorithm of the present invention insofar as it is capable of controlling the ignition timing while using a filtered value obtained by performing ϵ-filtering on a function representative of the convergence property of the maximum pressure angle to the target angle, such that the maximum pressure angle converges to the target angle.

For example, an algorithm expressed by the following equations (26) to (31), in which an ϵ-filtering algorithm is applied to a PID control algorithm, may be used as the predetermined feedback control algorithm. In this case, the difference E#i corresponds to the function representative of the convergence property of the maximum pressure angle θPMAX#i to the target angle θPMAX_CMD#i. Further, in the following equation (27), E_f#i represents a difference filtered value obtained by performing ϵ-filtering on the difference E#i. In the equation (31), KP, KI, and KD represent a predetermined proportional term gain, a predetermined integral term gain, and a predetermined differential term gain, respectively.

$$E\#i(k)\theta PMAX\#i(k) - \theta PMAX\_CMD\#i(k) \qquad (26)$$

$$E\_f\#i(k) = \frac{1}{n+1}\sum_{j=0}^{n} F\varepsilon(E\#i(k-mj), E\#i(k)) \qquad (27)$$

WHEN (28)
$E\#i(k-mj) > E\#i(k) + \varepsilon$
$F\varepsilon(E\#i(k-mj), E\#i(k)) = E\#i(k)$ WHEN (29)
$E\#i(k) - \varepsilon \leq E\#i(k-mj) \leq E\#i(k) + \varepsilon$
$F\varepsilon(E\#i(k-mj), E\#i(k)) = E\#i(k-mj)$ WHEN (30)
$E\#i(k-mj) < E\#i(k) - \varepsilon$
$F\varepsilon(E\#i(k-mj), E\#i(k)) = E\#i(k)$ $$IGSLD\#i(k) = \qquad (31)$$
$$KP \cdot E\_f\#i(k) + KI \cdot \sum_{j=1}^{k} E\_f\#i(j) + KD \cdot (E\_f\#i(k) - E\_f\#i(k-1))$$

When the maximum pressure angle correction term IGSLD#i is calculated using the control algorithm expressed by the aforementioned equations (26) to (31), if the engine 3 is in the steady operating condition, the use of the difference filtered value E_f#i makes it possible to suppress the influence of the high-frequency noise components of the maximum pressure angle θPMAX#i, thereby making it possible to enhance the stability of the ignition timing control, compared with a case in which the difference E#i is used without ϵ-filtering. Further, if the engine 3 is in the transient operating condition, the use of the difference filtered value E_f#i makes it possible to ensure an excellent follow-up property of the maximum pressure angle θPMAX#i to the target angle θPMAX_CMD#i, even when a sharp increase in the difference E#i temporarily occurs.

Further, as the predetermined feedback control algorithm, there may be used a PI control algorithm in which a differential term of the equation (31) (a third term on the right side of the equation) is omitted, a PD control algorithm in which an integral term of the equation (31) (a second term on the right side of the equation) is omitted, and so forth. Furthermore, as the predetermined feedback control algorithm, there may be used a predetermined algorithm to which is applied one of the PID control algorithm, the PI control algorithm, and the PD control algorithm. Further, at least one of the P term, the I term, and the D term in such a predetermined algorithm may be calculated using the difference filtered value E_f#i It is further understood by those skilled in the art that the foregoing are preferred embodiments of the invention, and that various changes and modifications may be made without departing from the spirit and scope thereof.

What is claimed is:

1. An ignition timing control system for an internal combustion engine, comprising:
   in-cylinder pressure-detecting means for detecting in-cylinder pressure of the engine;
   crank angle position-detecting means for detecting a crank angle position of the engine;
   maximum pressure angle-calculating means for calculating a crank angle position maximizing the in-cylinder pressure, as a maximum pressure angle, based on the detected in-cylinder pressure and the detected crank angle position;
   target angle-setting means for setting a target angle serving as a target to which the maximum pressure angle should be controlled; and
   ignition timing-calculating means for calculating ignition timing such that the calculated maximum pressure angle converges to the set target angle, with a control algorithm to which is applied a predetermined feedback control algorithm, while using a filtered value obtained by performing $\epsilon$-filtering on a function which contains a difference between one of the maximum pressure angle and the target angle and the other thereof and is representative of a convergence property of the maximum pressure angle to the target angle.

2. An ignition timing control system as claimed in claim 1, wherein the predetermined feedback control algorithm is a predetermined algorithm to which is applied a sliding mode control algorithm,
   wherein the function is a switching function,
   wherein the filtered value is a switching function filtered value obtained by performing $\epsilon$-filtering on the switching function,
   wherein the ignition timing is calculated with the control algorithm such that the ignition timing has a component of a total sum of a plurality of inputs calculated with the predetermined algorithm, and
   wherein the plurality of inputs include a first input calculated based on the switching function, and a second input calculated based on the switching function filtered value.

3. An ignition timing control system as claimed in claim 1, wherein the predetermined feedback control algorithm is a predetermined algorithm to which is applied one of a PID control algorithm, a PI control algorithm, and a PD control algorithm,
   wherein the function is the difference between one of the maximum pressure angle and the target angle and the other thereof,
   wherein the filtered value is a difference filtered value obtained by performing $\epsilon$-filtering on the difference, and
   wherein at least one of a proportional term, an integral term, and a differential term is calculated with the predetermined algorithm, using the difference filtered value.

4. A method of controlling ignition timing of an internal combustion engine, comprising:
   an in-cylinder pressure-detecting step of detecting in-cylinder pressure of the engine;
   a crank angle position-detecting step of detecting a crank angle position of the engine;
   a maximum pressure angle-calculating step of calculating a crank angle position maximizing the in-cylinder pressure, as a maximum pressure angle, based on the detected in-cylinder pressure and the detected crank angle position;
   a target angle-setting step of setting a target angle serving as a target to which the maximum pressure angle should be controlled; and
   an ignition timing-calculating step of calculating ignition timing such that the calculated maximum pressure angle converges to the set target angle, with a control algorithm to which is applied a predetermined feedback control algorithm, while using a filtered value obtained by performing $\epsilon$-filtering on a function which contains a difference between one of the maximum pressure angle and the target angle and the other thereof and is representative of a convergence property of the maximum pressure angle to the target angle.

5. A method as claimed in claim 4, wherein the predetermined feedback control algorithm is a predetermined algorithm to which is applied a sliding mode control algorithm,
   wherein the function is a switching function,
   wherein the filtered value is a switching function filtered value obtained by performing $\epsilon$-filtering on the switching function,
   wherein the ignition timing is calculated with the control algorithm such that the ignition timing has a component of a total sum of a plurality of inputs calculated with the predetermined algorithm, and
   wherein the plurality of inputs include a first input calculated based on the switching function, and a second input calculated based on the switching function filtered value.

6. A method as claimed in claim 4, wherein the predetermined feedback control algorithm is a predetermined algorithm to which is applied one of a PID control algorithm, a PI control algorithm, and a PD control algorithm,
   wherein the function is the difference between one of the maximum pressure angle and the target angle and the other thereof,
   wherein the filtered value is a difference filtered value obtained by performing $\epsilon$-filtering on the difference, and
   wherein at least one of a proportional term, an integral term, and a differential term is calculated with the predetermined algorithm, using the difference filtered value.

7. An engine control unit including a control program for causing a computer to execute a method of controlling ignition timing of an internal combustion engine,
   wherein the control program causes the computer to detect in-cylinder pressure of the engine, detect a crank angle position of the engine, calculate a crank angle position maximizing the in-cylinder pressure, as a maximum pressure angle, based on the detected in-cylinder pressure and the detected crank angle position, set a target angle serving as a target to which the maximum pressure angle should be controlled, and calculate ignition timing such that the calculated maximum pressure angle converges to the set target angle, with a control algorithm to which is applied a predetermined feedback control algorithm, while using a filtered value obtained by performing $\epsilon$-filtering on a function which contains a difference between one of the maximum pressure angle and the target angle and the other thereof and is representative of a convergence property of the maximum pressure angle to the target angle.

8. An engine control unit as claimed in claim 7, wherein the predetermined feedback control algorithm is a predetermined algorithm to which is applied a sliding mode control algorithm, wherein the function is a switching function, wherein the filtered value is a switching function filtered value obtained by performing $\epsilon$-filtering on the switching function, wherein the ignition timing is calculated with the control algorithm such that the ignition timing has a component of a total sum of a plurality of inputs calculated with the predetermined algorithm, and wherein the plurality of inputs include a first input calculated based on the switching function, and a second input calculated based on the switching function filtered value.

9. A engine control unit as claimed in claim 7, wherein the predetermined feedback control algorithm is a predetermined algorithm to which is applied one of a PID control algorithm, a PI control algorithm, and a PD control algorithm, wherein the function is the difference between one of the maximum pressure angle and the target angle and the other thereof, wherein the filtered value is a difference filtered value obtained by performing $\epsilon$-filtering on the difference, and wherein at least one of a proportional term, an integral term, and a differential term is calculated with the predetermined algorithm, using the difference filtered value.

* * * * *